(12) United States Patent
Jun

(10) Patent No.: US 10,434,964 B2
(45) Date of Patent: Oct. 8, 2019

(54) METHOD AND APPARATUS FOR PROVIDING VEHICLE SERVICE

(71) Applicant: Samsung Electronics Co., Ltd., Gyeonggi-do (KR)

(72) Inventor: Hee-June Jun, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/133,960

(22) Filed: Apr. 20, 2016

(65) Prior Publication Data

US 2016/0304042 A1 Oct. 20, 2016

(30) Foreign Application Priority Data

Apr. 20, 2015 (KR) ........................ 10-2015-0055499

(51) Int. Cl.
*B60R 16/037* (2006.01)
*B60H 1/00* (2006.01)

(52) U.S. Cl.
CPC ....... *B60R 16/037* (2013.01); *B60H 1/00735* (2013.01); *B60K 2370/195* (2019.05); *B60K 2370/589* (2019.05); *G07C 2209/63* (2013.01)

(58) Field of Classification Search
CPC ... B60R 16/037; B60R 25/20; B60H 1/00735; B60K 2350/357; B60K 2350/906; G07C 2209/63
See application file for complete search history.

(56) References Cited

U.S. PATENT DOCUMENTS

| 8,315,617 | B2 * | 11/2012 | Tadayon | H04M 3/53 455/418 |
| 2009/0248244 | A1 * | 10/2009 | Sumimoto | B60H 1/00735 701/36 |
| 2011/0281562 | A1 * | 11/2011 | Videtich | H04W 4/046 455/414.1 |
| 2013/0217331 | A1 | 8/2013 | Manente | |
| 2014/0163774 | A1 | 6/2014 | Demeniuk | |
| 2014/0309813 | A1 * | 10/2014 | Ricci | B60Q 1/00 701/2 |
| 2015/0057839 | A1 * | 2/2015 | Chang | B60R 16/037 701/2 |
| 2015/0066247 | A1 * | 3/2015 | Dale | G08C 17/02 701/2 |
| 2015/0149042 | A1 * | 5/2015 | Cooper | B60R 16/037 701/48 |
| 2016/0288796 | A1 * | 10/2016 | Yuan | B60R 25/01 |

OTHER PUBLICATIONS

European Search Report dated Sep. 19, 2016 issued in counterpart application No. 16166017.0-1752, 7 pages.

* cited by examiner

*Primary Examiner* — Aaron L Troost
(74) *Attorney, Agent, or Firm* — The Farrell Law Firm, P.C.

(57) ABSTRACT

A method for providing a vehicle service is provided. The method includes detecting at least one of a region of a vehicle where an electronic device is located and user information of the electronic device, detecting vehicle service information based on at least one of the detected region of the electronic device and the detected user information of the electronic device, and providing the vehicle service corresponding to the detected vehicle service information.

20 Claims, 6 Drawing Sheets

METHOD AND APPARATUS FOR PROVIDING VEHICLE SERVICE

PRIORITY

This application claims priority under 35 U.S.C. § 119(a) to a Korean Patent Application filed in the Korean Intellectual Property Office on Apr. 20, 2015, and assigned Serial No. 10-2015-0055499, the entire content of which is incorporated herein by reference.

BACKGROUND

1. Field of the Disclosure

The present disclosure relates generally to a method and apparatus for providing a vehicle service.

2. Description of the Related Art

Generally, to protect children in vehicles, users of a vehicle may mount child vehicle seats or set a child lock function on the vehicle. Further, a user getting into a vehicle may adjust a seat or a temperature around the seat. As such, a vehicle service such as door lock, window lock, seat adjustment, or temperature adjustment is commonly provided to users in a vehicle by manual manipulation by the users. However, there is needed a method for automatically providing such a vehicle service to a user upon the user entering the vehicle.

SUMMARY

The present disclosure has been made to address at least the problems and disadvantages described above, and to provide at least the advantages described below.

Accordingly, an aspect of the present disclosure is to provide a method and apparatus for providing a vehicle service based on a position of a user in a vehicle.

In accordance with an aspect of the present disclosure, a method for providing a vehicle service is provided. The method includes detecting at least one of a region of a vehicle where an electronic device is located and user information of the electronic device, detecting vehicle service information based on at least one of the detected region of the electronic device and the detected user information of the electronic device, and providing the vehicle service corresponding to the detected vehicle service information.

In accordance with an aspect of the present disclosure, an apparatus for providing a vehicle service is provided. The apparatus includes at least two short-range communication units, a memory that stores at least one vehicle service information corresponding to at least one of a region of a vehicle where an electronic device is located and user information of the electronic device, and a controller that detects at least one of the region of the vehicle where the electronic device is located and the user information of the electronic device, detects vehicle service information based on at least one of the detected region of the electronic device and the detected user information of the electronic device, and provides a vehicle service corresponding to the detected vehicle service information.

In accordance with an aspect of the present disclosure, an apparatus for providing a vehicle service is provided. The apparatus includes at least one short-range communication unit, a memory that stores at least one vehicle service information corresponding to at least one of a region of a vehicle where an electronic device is located and user information of the electronic device, and a processor that detects at least one of the region of the vehicle where the electronic device is located and the user information of the electronic device, detects vehicle service information based on at least one of the detected region of the electronic device and the detected user information of the electronic device, and transmits the detected vehicle service information to the vehicle.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF EMBODIMENTS OF THE PRESENT DISCLOSURE

Figure 1:
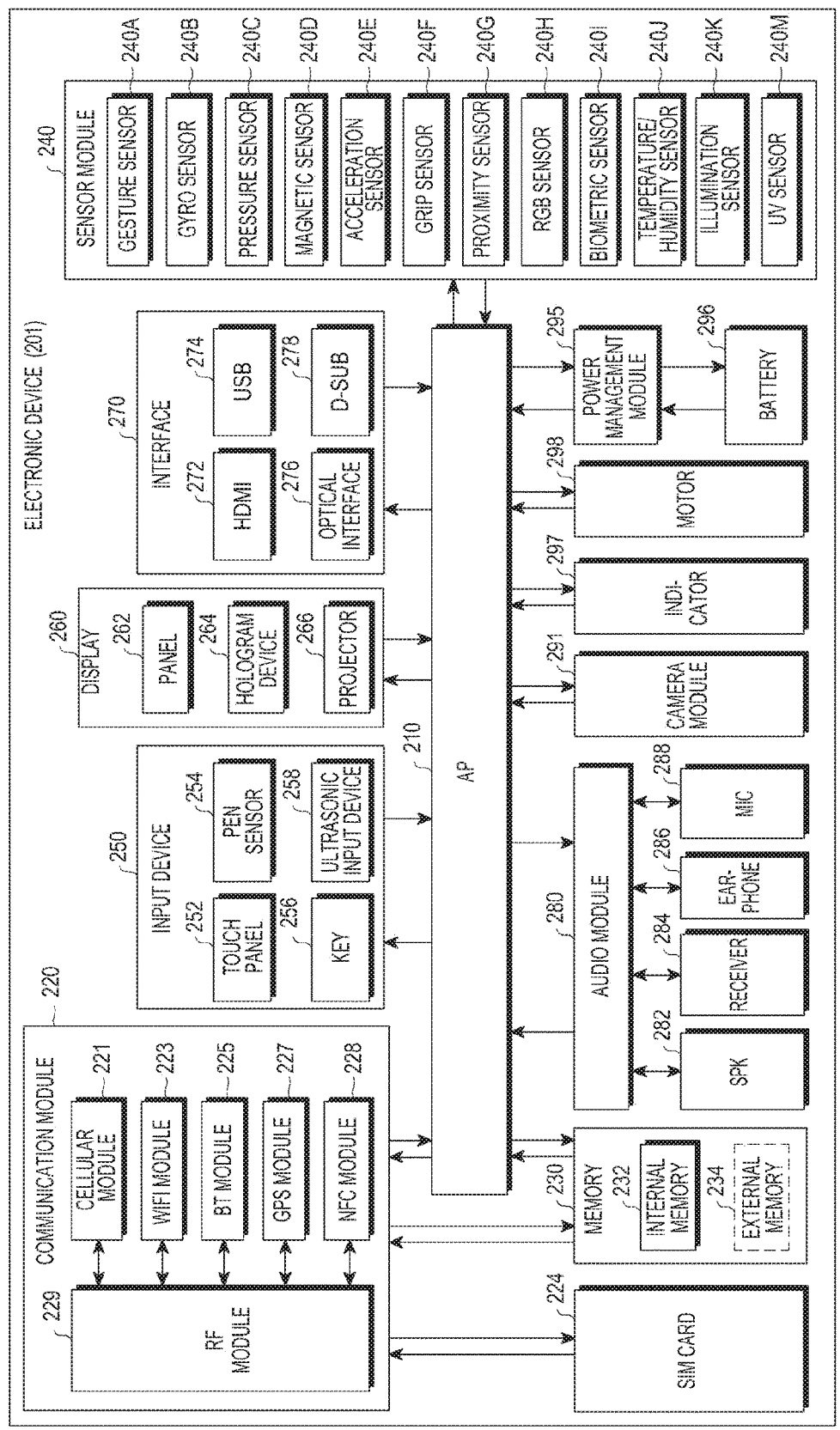
FIG. 1 is a block diagram of a configuration of an electronic device, according to an embodiment of the present disclosure.

Hereinafter, embodiments of the present disclosure will be disclosed with reference to the accompanying drawings. However, the description is not intended to limit the present disclosure to particular embodiments, and the description should be construed as including various modifications, equivalents, and/or alternatives according to the embodiments of the present disclosure. In regard to the description of the drawings, like reference numerals refer to like elements.

In the present disclosure, an expressions such as "having," "may have," "comprising," and "may comprise" indicate the existence of a corresponding characteristic (such as a numerical value, function, operation, or component) and do not exclude the existence of additional characteristic.

In the present disclosure, expressions such as "A or B," "at least one of A or/and B," and "one or more of A or/and B" may include all possible combinations of items listed together. For example, "A or B," "at least one of A and B," and "one or more of A or B" may indicate (1) including A, (2) including B, or (3) including both A and B.

Expressions such as "first," "second," "primarily," and "secondary," used in various exemplary embodiments may represent various elements regardless of order and/or importance and do not limit corresponding elements. The expressions may be used for distinguishing one element from another element. For example, a first user device and a second user device may represent different user devices regardless of order or importance. For example, a first element may be referred to as a second element without deviating from the scope of the present disclosure, and similarly, a second element may be referred to as a first element.

When it is described that an element (such as a first element) is operatively or communicatively "coupled" to or "connected" to another element (such as a second element), the first element can be directly connected to the second element or can be connected to the second element through a third element. However, when it is described that an element (such as a first element) is "directly connected" or "directly coupled" to another element (such as a second element), it means that there is no intermediate element (such as a third element) between the first element and the second element.

The expression "configured to (or set)", used in the present disclosure, may be used interchangeably with, for example, "suitable for," "having the capacity to," "designed to," "adapted to," "made to," or "capable of" according to the situation. The term "configured to (or set)" does not always mean only "specifically designed to" by hardware. Alternatively, in some situations, the expression "apparatus configured to" may mean that the apparatus "can" operate together with another apparatus or component. For example, the phrase "a processor configured (or set) to perform A, B, and C" may refer to a generic-purpose processor (such as a CPU or an application processor) that can perform a corresponding operation by executing at least one software program stored at an exclusive processor (such as an embedded processor) for performing a corresponding operation or at a memory device.

Terms defined in the present disclosure are used only for describing specific embodiments and are not intended to limit the scope of other embodiments. When a singular form is used herein, it should be understood to include plural forms as well, unless the context dictates otherwise. All terms including technical and scientific terms, used herein, should be construed to have the same meaning commonly understood by a person of ordinary skill in the art. Additionally, terms defined in a general dictionary should be interpreted to have meanings consistent with their meanings in the context of the related technology and are not to be interpreted in an ideal or excessively formal manner unless explicitly so defined. In some cases, terms defined in the present disclosure should not be interpreted to exclude the embodiments of the present disclosure.

An electronic device according to various embodiments of the present disclosure may be a device including a communication function. For example, the electronic device may include at least one of a smart phone, a tablet personal computer (PC), a mobile phone, a video phone, an electronic book (e-book) reader, a desktop PC, a laptop PC, a netbook computer, a personal digital assistant (PDA), a portable multimedia player (PMP), an MP3 player, mobile medical equipment, a camera, and a wearable device (e.g., smart glasses, a head-mounted device (HMD), an electronic cloth, an electronic bracelet, an electronic necklace, an appcessory, an electronic tattoo, a smart mirror, and a smart watch).

According to some embodiments of the present disclosure, the electronic device may be a smart home appliance. The smart home appliance may include at least one of a television (TV), a digital versatile disk (DVD) player, audio equipment, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, and an electronic frame.

According to another embodiment of the present disclosure, the electronic device may include at least one of various medical equipment (e.g., various portable medical measurement systems, such as a blood sugar measurement device, a heartbeat measurement device, a blood pressure measurement device, or a body temperature measurement device, magnetic resonance angiography (MRA), magnetic resonance imaging (MRI), computed tomography (CT), an imaging device, or an ultrasonic device), a navigation system, a global positioning system (GPS) receiver, an event data recorder (EDR), a flight data recorder (FDR), a vehicle infotainment device, electronic equipment for ships (e.g., a navigation system and a gyro compass for ships), avionics, a security device, a vehicle head unit, an industrial or home robot, an automatic teller machine (ATM), a point of sales (POS) device, Internet of Things (IoT) devices (e.g., electric light bulbs, various sensors, electricity or gas meters, sprinkler devices, fire alarm devices, thermostats, streetlights, toasters, exercise machines, hot-water tanks, heaters, boilers, etc.).

According to some embodiments of the present disclosure, the electronic device may include a part of a furniture or building/structure, an electronic board, an electronic signature receiving device, a projector, and various measuring instruments (e.g., a water, electricity, gas, or electric wave measuring device).

The electronic device according to various embodiments of the present disclosure may be one of the above-listed devices or a combination thereof.

The electronic device according to various embodiments of the present disclosure may be a flexible device.

It should be obvious to those of ordinary skill in the art that the electronic device, according to various embodiments of the present disclosure, is not limited to the above-listed devices and may include new electronic devices according to the development of new technologies.

Hereinafter, an electronic device, according to various embodiments of the present disclosure, will be described with reference to the accompanying drawings. As used herein, the term "user" may refer to a person who uses the electronic device or to a device using the electronic device (e.g., an artificial intelligence electronic device).

FIG. 1 is a block diagram of a configuration of an electronic device, according to an embodiment of the present disclosure.

Referring to FIG. 1, an electronic device 201 is provided. The electronic device 201 includes one or more application processors (APs) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The AP 210 controls multiple hardware or software components connected to the AP 210 by driving an Operating System (OS) or an application program, and performs processing and operations with respect to various data including multimedia data. The AP 210 may be implemented with a system on chip (SoC).

According to an embodiment of the present disclosure, the AP 210 may further include a graphic processing unit (GPU) and/or an image signal processor. The AP 210 may include at least some of the elements illustrated in FIG. 1 (e.g., acellular module 221). The AP 210 loads a command or data received from at least one of other elements (e.g., a non-volatile memory) into a volatile memory and processes the command or data and stores various data in the non-volatile memory.

The communication module 220 may include the cellular module 221, a WiFi module 223, a Bluetooth (BT) module 225, a global positioning system (GPS) module 227, a near field communication (NFC) module 228, and a radio frequency (RF) module 229.

The cellular module 221 provides a voice call, a video call, a text service, or an Internet service over a communication network.

According to an embodiment of the present disclosure, the cellular module 221 identifies and authenticates the electronic device 201 in a communication network by using the SIM card 224. The cellular module 221 may perform at least one of the functions that may be provided by the AP 210. The cellular module 221 may include a communication processor (CP).

Each of the WiFi module 223, the BT module 225, the GPS module 227, and the NFC module 228 may include a processor for processing data transmitted and received by a corresponding module.

According to some embodiments of the present disclosure, at least some (e.g., two or more) of the cellular module 221, the WiFi module 223, the BT module 225, the GPS module 227, and the NFC module 228 may be included in one integrated chip (IC) or IC package.

The RF module 229 transmits and receives a communication signal (e.g., an RF signal). The RF module 229 may include a transceiver, a power amp module (PAM), a frequency filter, a low noise amplifier (LNA), or an antenna.

According to another embodiment of the present disclosure, at least one of the cellular module 221, the WiFi module 223, the BT module 225, the GPS module 227, and the NFC module 228 may transmit and receive an RF signal through a separate RF module.

The SIM card 224 is a card including a SIM and/or an embedded SIM, and may include unique identification (ID) information (e.g., an integrated circuit card identifier (ICCID) or subscriber information (e.g., an International mobile subscriber identity (IMSI)).

The memory 230 (e.g., the memory 130) may include an internal memory 232 or an external memory 234.

The internal memory 232 may include at least one of a volatile memory (e.g., dynamic random access memory (DRAM), static RAM (SRAM), synchronous dynamic RAM (SDRAM), and a non-volatile memory (e.g., one time programmable read only memory (OTPROM), programmable ROM (PROM), erasable and programmable ROM (EPROM), electrically erasable and programmable ROM (EEPROM), mask ROM, flash ROM, NAND flash memory, or NOR flash memory), and a solid state drive (SSD).

The external memory 234 may include flash drive, for example, a compact flash (CF), secure digital (SD), micro-SD, mini-SD, extreme digital (xD), or a memory stick. The external memory 234 may be functionally and/or physically connected with the electronic device 201 through various interfaces.

The sensor module 240 measures a physical quantity or senses an operation state of the electronic device 201 to convert the measured or sensed information into an electric signal. The sensor module 240 may include at least one of a gesture sensor 240A, a gyro sensor 240B, a pressure sensor 240C, a magnetic sensor 240D, an acceleration sensor 240E, a grip sensor 240F, a proximity sensor 240G, a red-green-blue (RGB) sensor 240H, a biometric sensor 240I, a temperature/humidity sensor 240J, an illumination sensor 240K, and a ultraviolet (UV) sensor 240M. Additionally or alternatively, the sensor module 240 may include an E-nose sensor, an electromyography (EMG) sensor, an electroencephalogram (EEG) sensor, an electrocardiogram (ECG) sensor, or a fingerprint sensor. The sensor module 240 may further include a control circuit for controlling at least one sensor included therein.

In some embodiments of the present disclosure, the electronic device 201 may further include a processor configured to control the sensor module 240 as part of or separately from the AP 210, to control the sensor module 240 during a sleep state of the AP 210.

The input device 250 may include a touch panel 252, a (digital) pen sensor 254, a key 256, or an ultrasonic input device 258.

The touch panel 252 may use at least one of a capacitive type, a resistive type, an IR type, or an ultrasonic type. The touch panel 252 may further include a control circuit. The touch panel 252 may further include a tactile layer to provide tactile reaction to the user.

The (digital) pen sensor 254 may include a recognition sheet which is a part of the touch panel 252 or a separate recognition sheet.

The key 256 may include a physical button, an optical key, or a keypad.

The ultrasonic input device 258 senses ultrasonic waves generated in an input means for generating ultrasonic waves through a microphone 288 in the electronic device 201 and checks data.

The display 260 may include a panel 262, a hologram 264, or a projector 266.

The panel 262 may be implemented to be flexible, transparent, or wearable. The panel 262 may be configured with the touch panel 252 in one module.

The hologram 264 displays a stereoscopic image in the air by using interference of light.

The projector 266 displays an image onto an external screen through projection of light. The screen may be positioned inside or outside the electronic device 201.

According to an embodiment of the present disclosure, the display 260 may further include a control circuit for controlling the panel 262, the hologram 264, or the projector 266.

The interface 270 may include a high-definition multimedia interface (HDMI) 272, a universal serial bus (USB) 274, an optical communication 276, or a D-subminiature 278. Additionally or alternatively, the interface 270 may include a mobile high-definition link (MHL) interface, an SD/multimedia card (MMC) interface, or an infrared data association (IrDA) interface.

The audio module 280 bi-directionally converts sound and an electric signal. The audio module 280 processes sound information input or output through a speaker 282, a receiver 284, an earphone 286, or the microphone 288.

The camera module 291 captures a still image or a moving image, and according to an embodiment of the present disclosure, may include one or more image sensors (e.g., a front sensor or a rear sensor), a lens, an image signal processor (ISP), or a flash (e.g., an LED or a xenon lamp).

The power management module 295 manages power of the electronic device 201. According to an embodiment of the present disclosure, the power management module 295 may include a power management integrated circuit (PMIC), a charger IC, or a battery gauge. The PMIC may have a wired and/or wireless charging scheme.

The wireless charging scheme includes a magnetic-resonance type, a magnetic induction type, and an electromagnetic type, and for wireless charging, an additional circuit, for example, a coil loop, a resonance circuit, or a rectifier may be further included. The battery gauge measures the remaining capacity, voltage, current, or temperature of the battery 296 during charging.

The battery 296 may include a rechargeable battery and/or a solar battery.

The indicator 297 displays a particular state, for example, a booting state, a message state, or a charging state, of the electronic device 201 or a part thereof (e.g., the AP 210).

The motor 298 converts an electric signal into mechanical vibration or generates vibration or a haptic effect.

The electronic device 201 may include a processing device (e.g., a GPU) for supporting a mobile TV. The processing device for supporting the mobile TV processes media data according to a standard such as digital multimedia broadcasting (DMB), digital video broadcasting (DVB), or mediaFlo™.

Each of the foregoing elements described herein may include one or more components, and a name of the part may vary with the type of the electronic device 201. The electronic device 201, according to the present disclosure, may include at least one of the foregoing elements, and some of the elements may be omitted therefrom or other elements may be further included therein. Some of the elements of the electronic device 201 may be coupled into one entity, thereby performing the same function as those of the elements that have not been coupled.

A term "module" used herein may refer to a unit including one of or a combination of two or more of hardware, software, and firmware. The "module" may be interchangeably used with a unit, a logic, a logical block, a component, or a circuit. The "module" may be a minimum unit or a portion of an integrated component. The "module" may be a minimum unit or a portion thereof performing one or more functions. The "module" may be implemented mechanically or electronically. For example, the "module" may include at least one of an application-specific integrated circuit (ASIC) chip, field-programmable gate arrays (FPGAs), and a programmable-logic device performing certain operations already known or to be developed.

According to various embodiments, some electronic devices (for example, modules or functions thereof) or methods (for example, operations) may be implemented with instructions stored in a computer-readable storage medium in a programming module type. When the instructions are executed by one or more processors (for example, the AP 210), the one or more processors may perform functions corresponding to the instructions. The computer-readable storage medium may be the memory 230.

The computer readable recording medium includes Magnetic Media (e.g., hard disk, floppy disk, or magnetic tape), Optical Media (e.g., compact disc read only memory (CD-ROM) or DVD), magneto-optical media (e.g., a floptical disk), and a hardware device (e.g., ROM, RAM, or flash memory) for storing and executing program commands. Further, the program instructions include a machine language code created by a complier and a high-level language code executable by a computer using an interpreter. The foregoing hardware device may be configured to be operated as at least one software module to perform an operation of the present disclosure, or vice versa.

Modules or programming modules according to various embodiments of the present disclosure may include one or more of the foregoing elements, have some of the foregoing elements omitted, or further include additional other elements. Operations performed by the modules, the programming modules or other elements may be executed in a sequential, parallel, repetitive, or heuristic manner. Also, some of the operations may be executed in different order or omitted, or may have additional different operations.

The embodiments disclosed herein and the drawings have been provided to describe the present disclosure and to help in understanding of the present disclosure, and are not intended to limit the scope of the present disclosure. Therefore, it should be construed that the scope of the present disclosure includes any change or other various embodiments based on the technical spirit of the present disclosure, as well as the embodiments described herein.

Figure 2:
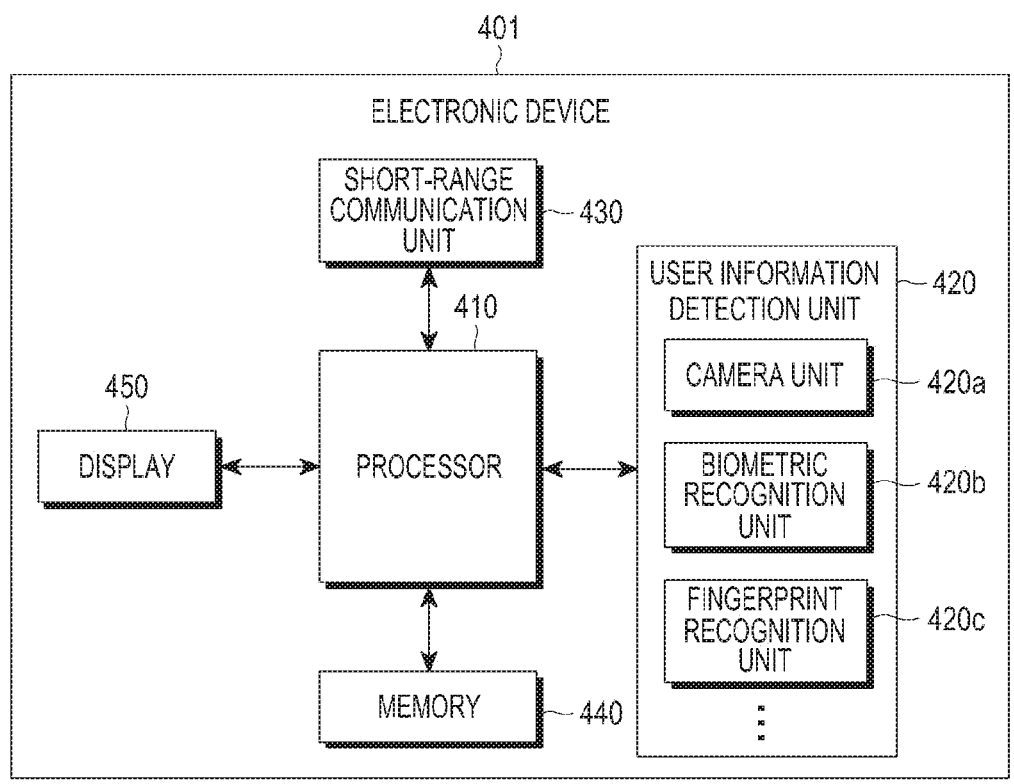
FIG. 2 is a block diagram of a configuration of an electronic device for providing a vehicle service, according to an embodiment of the present disclosure.

FIG. 2 is a block diagram of a configuration of an electronic device for providing a vehicle service, according to an embodiment of the present disclosure.

Referring to FIG. 2, an electronic device 401 (e.g., the electronic device 201 of FIG. 1) is provided. The electronic device 401 includes a processor 410, a user information detection unit 420, a short-range communication unit 430, a memory 440, and a display 450.

Figure 3:
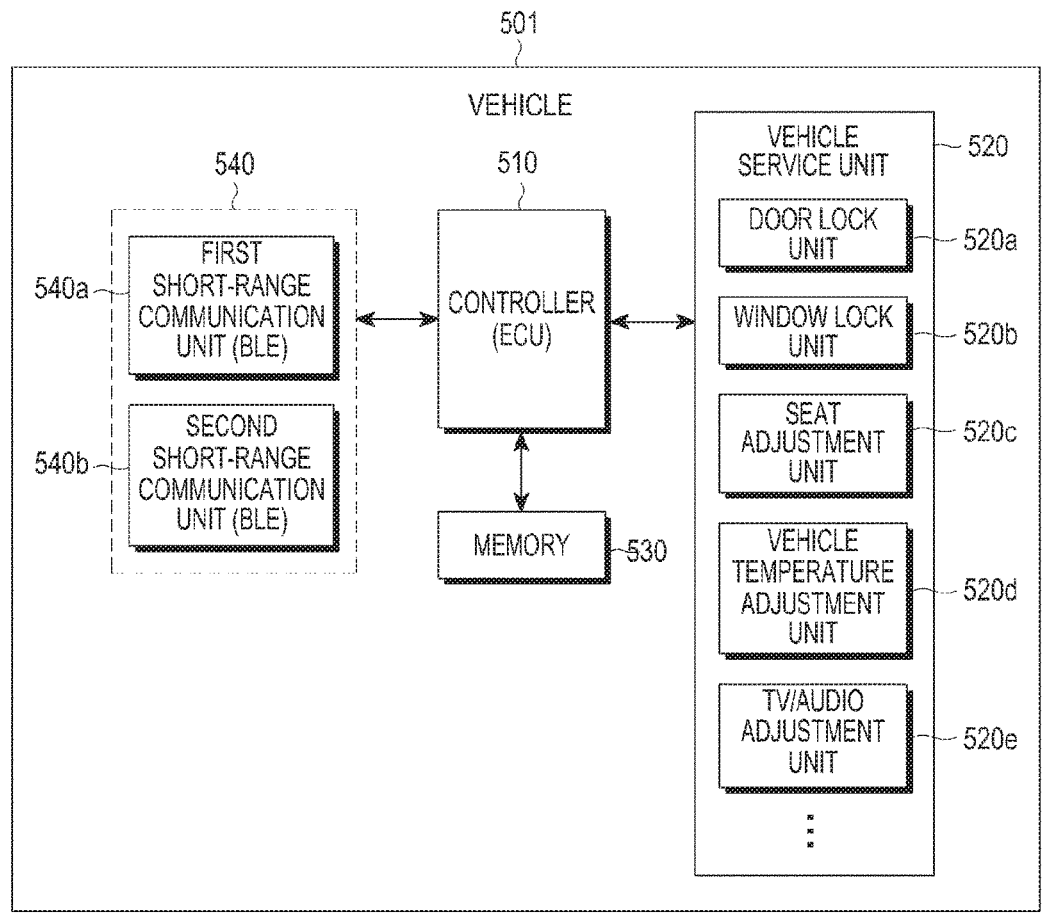
FIG. 3 is a block diagram of a configuration of a vehicle for providing a vehicle service, according to an embodiment of the present disclosure.

According to an embodiment of the present disclosure, the processor 410 transmits user information of the electronic device 410 to a vehicle 501 (as shown in FIG. 3) when the electronic 401 is located in the vehicle 501.

The processor 410 performs short-range communication with at least two short-range communication units 540 (shown in FIG. 3) included in the vehicle 501 by using the short-range communication unit 430 of the electronic device, and senses through the short-range communication that the electronic device 401 is located in the vehicle 501. For example, the processor 410 senses that the electronic device 401 is located in the vehicle 501 by using triangulation among the two short-range communication units included in the vehicle 501 and the short-range communication unit 430 included in the electronic device 401. The processor 410 transmits, to the vehicle through the short-range communication, the user information of the electronic device 401 registered in advance to receive the vehicle service.

If the electronic device 401 is located in the vehicle 501, the processor 410 transmits vehicle service information detected based on at least one of a region of the vehicle 501 where the electronic device 401 is located and user information of the electronic device 401 to the vehicle 501.

That is, the processor 410 performs short-range communication with the at least two short-range communication units 540 included in the vehicle 501 by using the short-range communication unit 430, senses through the short-range communication that the electronic device 401 is located in the vehicle, and detects a region of the vehicle 501 (e.g., a driver's seat, a seat next to the driver, a left back seat, or a right back seat) where the electronic device 401 is located. For example, the processor 410 detects a region of the vehicle 501 where the electronic device 401 is located by using two short-range communication units provided in the vehicle 501 and triangulation between two short-range communication units provided in the vehicle 501 and the short-range communication unit 430 included in the electronic device 401. The processor 410 receives region information of the location of the electronic device 401 from the vehicle 501 through the short-range communication.

The processor 410 detects user information of the electronic device 401 registered in advance to receive a vehicle service.

The processor 410 detects vehicle service information corresponding to at least one of the detected region of the electronic device 401 and the detected user information of the electronic device 401 from at least one vehicle service information stored in the memory 440, and transmits the detected vehicle service information to the vehicle through the short-range communication.

The vehicle service information may include at least one of a door lock, window lock, seat adjustment, vehicle temperature adjustment, and TV/audio adjustment.

Upon sensing that the electronic device 401 is located in the vehicle, the processor 410 transmits user information stored in the memory 440 or the user information of the electronic device 401 detected by the user information detection unit 420 to the vehicle 501. The user information of the electronic device 401 may include an identification (ID) number of the electronic device 401, a phone number of the electronic device 401, a facial image, biometric information, fingerprint information, or unlock information of the electronic device 401.

Upon sensing that the electronic device 401 is located in the vehicle 501, the processor 410 detects ID information (e.g., a unique ID or phone number) of the electronic device 401 stored in the memory 440 and transmits the detected ID information of the electronic device 401 as the user information of the electronic device 401 to the vehicle 501.

Upon sensing that the electronic device 401 is located in the vehicle, the processor 410 automatically drives a camera unit 420*a* (e.g., the camera module 291 of FIG. 1) to photograph a face of the user of the electronic device 401 and transmits the captured facial image of the user as the user information of the electronic device 401 to the vehicle 501.

Upon sensing that the electronic device 401 (e.g., a wearable device) is located in the vehicle, the processor 410 detects the biometric information of the user wearing the electronic device 401 through a biometric recognition unit 420*b* (e.g., the biometric sensor 240I of FIG. 1) and transmits the detected biometric information as the user information of the electronic device 401 to the vehicle 501.

Upon sensing that the electronic device 401 is located in the vehicle, the processor 410 detects fingerprint information of the user who is verified to use the electronic device 401 through a fingerprint recognition unit 420*c*, and transmits the detected fingerprint information as the user information of the electronic device 401 to the vehicle 501.

Upon sensing that the electronic device 401 is located in the vehicle 501, the processor 410 detects a type of an unlock pattern for unlocking the electronic device 401 as the unlock information, and transmits the unlock information as the user information of the electronic device 401 to the vehicle 501. For example, if a plurality of unlock patterns for unlocking the electronic device 401 for multiple users are stored in the electronic device 401, the processor 410 detects a type of an unlock pattern that is input to unlock the electronic device 401 as the unlock information and transmits the unlock information as the user information of the electronic device 401 to the vehicle 501.

The processor 410 transmits the region information of the location of the electronic device 401 and the vehicle service information to the vehicle 501 or transmits the user information of the electronic device 401 and the region information of the location of the electronic device 401 to the vehicle 501.

The display 450 may include the display 260 of FIG. 1. The display 450 displays vehicle service information that may be provided according to a region (e.g., a driver's seat, a seat next to the driver, a left back seat, or a right back seat) of the vehicle 501 where the electronic device 401 is located.

The memory 440 may include the memory 230 of FIG. 1. The memory 440 stores the user information of the electronic device 401 (e.g., the ID information of the electronic device 401). The memory 440 stores at least one vehicle service information that may be detected based on at least one of the user information of the electronic device 401 and the region of the electronic device 401.

The short-range communication unit 430 (e.g., a BLE module or the BT module 225 of FIG. 1) performs short-range communication with the at least two short-range communication units 540 provided in the vehicle 501, and transmits the user information of the electronic device 401 or the vehicle service information to be provided to the electronic device 401 to the vehicle 501.

FIG. 3 is a block diagram of a configuration of a vehicle for providing a vehicle service, according to an embodiment of the present disclosure.

Referring to FIG. 3, a vehicle 501 is provided. The vehicle 501 includes a controller 510 (e.g., electronic control unit (ECU)), a vehicle service unit 520, a memory 530, and at least two short-range communication units 540.

According to an embodiment of the present disclosure, the controller 510 detects vehicle service information based on the region of the vehicle 501 where the electronic device 401 is located and the user information of the electronic device 401, and provides a vehicle service corresponding to the vehicle service information to the region of the electronic device 401 in the vehicle 501 or a peripheral region associated with the region of the electronic device 401.

The controller 510 performs short-range communication with the short-range communication unit 430 of the electronic device 401 by using the at least two short-range communication units 540, and receives the user information from the electronic device 401 located in the vehicle 501 through the short-range communication.

If the user information of the electronic device received from the electronic device 401 exists in user information of at least one electronic device stored in the memory 530, the controller 510 determines that the user information of the electronic device 401 is user information registered in advance to receive a vehicle service.

The controller 510 determines a region of the electronic device 401 in the vehicle 501 through the at least two short-range communication units 540. An operation of determining the region of the electronic device 401 in the vehicle 501 through the at least two short-range communication units 540 will be described in detail with reference to FIG. 4.

The controller 510 detects vehicle service information corresponding to at least one of the region of the electronic device 401 and the user information of the electronic device 401 from at least one vehicle services stored in the memory 530 and controls the vehicle service unit 520 to provide a vehicle service corresponding to the detected vehicle service information to a region (e.g., a driver's seat, a seat next to the driver, a left back seat, or a right back seat) of the electronic device 401 in the vehicle 501 or a peripheral region (e.g., a door, a window, a TV/audio equipment, or the like) associated with the region of the electronic device 401.

The vehicle service includes at least one of door lock, window lock, seat adjustment, vehicle temperature adjustment, and TV/audio adjustment.

If vehicle service information corresponding to at least one of a region of the electronic device 401 and user information of the electronic device 401 is the door lock, the controller 510 controls a door lock unit 520*a* of the vehicle service unit 520 to activate door lock in the region of the electronic device.

If vehicle service information corresponding to at least one of a region of the electronic device 401 and user information of the electronic device 401 is the window lock, the controller 510 controls a window lock unit 520b of the vehicle service unit 520 to activate window lock in the region of the electronic device 401.

If vehicle service information corresponding to at least one of a region of the electronic device 401 and user information of the electronic device 401 is the seat adjustment, the controller 510 controls a seat adjustment unit 520c of the vehicle service unit 520 to adjust a seat corresponding to the region of the electronic device 401 at a previously registered angle.

If vehicle service information corresponding to at least one of a region of the electronic device 401 and user information of the electronic device 401 is the vehicle temperature adjustment, the controller 510 controls a vehicle temperature adjustment unit 520d of the vehicle service unit 520 to adjust a temperature corresponding to the region of the electronic device 401 to a previously registered temperature.

If vehicle service information corresponding to at least one of a region of the electronic device 401 and user information of the electronic device 401 is the TV/audio adjustment, the controller 510 controls a TV/audio adjustment unit 520e of the vehicle service unit 520 to adjust TV/audio sound corresponding to the region of the electronic device. The controller 510 controls an on/off state of the TV/audio equipment according to the user information of the electronic device 401 or searches for and outputs a previously registered TV/audio channel.

The controller 510 provides the vehicle service corresponding to the vehicle service information received from the electronic device 401 to the region of the electronic device 401 located in the vehicle 501.

The controller 510 performs short-range communication with the short-range communication unit 430 of the electronic device 401 by using the at least two short-range communication units 540 and detects the region of the electronic device 401 located in the vehicle 501 through the short-range communication. Upon receiving the vehicle service information from the electronic device 401, the controller 510 provides a vehicle service corresponding to the vehicle service information received from the electronic device 401 to the detected region of the electronic device 401 or a peripheral region associated with the region of the electronic device 401.

The controller 510 receives the region information and the vehicle service information of the electronic device 401 or the user information and the region information of the electronic device 401 from the electronic device 401.

Upon receiving the region information and the vehicle information of the electronic device 401 from the electronic device 401, the controller 510 controls the vehicle service unit 520 to provide a vehicle service corresponding to the vehicle service information to the region of the electronic device 401 corresponding to the received region information of the electronic device 401 or the peripheral region associated with the region of the electronic device 401.

Upon receiving the user information of the electronic device 401 and the region information of the electronic device 401 from the electronic device 401, the controller 510 detects vehicle service information corresponding to the user information of the electronic device 401 and the region of the electronic device 401 from at least one vehicle service information stored in the memory 530, and provides a vehicle service corresponding to the vehicle service information to the received region of the electronic device 401 or the peripheral region associated with the region of the electronic device 401.

The vehicle service unit 520 provides the vehicle service under control of the controller 510. The vehicle service unit 520 may include at least one of the door lock unit 520a, the window lock unit 520b, the seat adjustment unit 520c, the vehicle temperature adjustment unit 520d, and the TV/audio adjustment unit 520e, and the vehicle service unit 520 may further include any element associated with the vehicle service.

The memory 530 stores at least one vehicle service information that may be detected based on at least one of the user information of the electronic device 401 and the region of the electronic device 401.

The at least two short-range communication units 540 (e.g., a BLE module or a BT module) performs short-range communication with the short-range communication unit 430 included in the electronic device 401 and receives at least one of the user information of the electronic device 401, the region information of the electronic device 401, and the vehicle service information from the electronic device 401.

Figure 4:
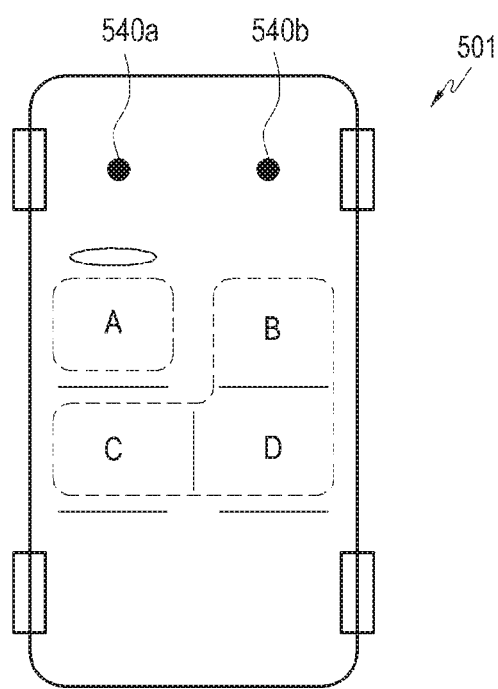
FIG. 4 is illustrates a method for providing a vehicle service in a vehicle, according to an embodiment of the present disclosure.

FIG. 4 illustrates a method for providing a vehicle service in a vehicle, according to an embodiment of the present disclosure.

Referring to FIG. 4, the vehicle 501 may be divided into several regions according to the number of seats in the vehicle 501. For example, the regions may be a driver's seat A, a seat B next to the driver, a left back seat C, and a right back seat D.

When the vehicle 501 is divided into regions, the driver's seat A, the seat B next to the driver, the left back seat C, and the right back seat D, as illustrated in FIG. 4, a received signal strength indicator (RSSI) value detected by each of a first short-range communication unit 540a and a second short-range communication unit 540b of the at least two short-range communication units 540 may be set in advance according to a region in the vehicle 501, as shown in Table 1.

TABLE 1

| | Type of Seat | | | |
|---|---|---|---|---|
| | Driver's Seat (A) | Seat Next to Driver (B) | Left Back Seat (C) | Right Back Seat (D) |
| First RSSI Value of First Short-Range Communication Unit | a1 | a2 | a3 | a4 |
| Second RSSI Value of Second Short-Range Communication Unit | b1 | b2 | b3 | b4 |

In Table 1, first RSSI values have a relationship of a1<a2<a3<a4, and a1, a2, a3, and a4 may indicate preset RSSI values or RSSI values in a predetermined range. Second RSSI values have a relationship of b1<b2<b3<b4, and b1, b2, b3, and b4 may indicate preset RSSI values or RSSI values in a predetermined range.

If the vehicle 501 detects the first RSSI value "a1" through the first short-range communication unit 540a and the second RSSI value "b1" through the second short-range communication unit 540b, the vehicle 501 detects that the region of the vehicle 501 where the electronic device 401 is located is the driver's seat A in the vehicle 501. If the vehicle 501 detects the first RSSI value "a2" through the first short-range communication unit 540a and the second RSSI value "b2" through the second short-range communication unit 540*b*, the vehicle 501 detects that the region of the vehicle 501 where the electronic device 401 is located is the seat B next to the driver in the vehicle 501. If the vehicle 501 detects the first RSSI value "a3" through the first short-range communication unit 540*a* and the second RSSI value "b3" through the second short-range communication unit 540*b*, the vehicle 501 detects that the region of the vehicle 501 where the electronic device 401 is located is the left back seat C in the vehicle 501. If the vehicle 501 detects the first RSSI value "a4" through the first short-range communication unit 540*a* and the second RSSI value "b4" through the second short-range communication unit 540*b*, the vehicle 501 detects that the region of the vehicle 501 where the electronic device 401 is located is the right back seat D in the vehicle 501.

If another electronic device is located outside the driver's seat A in the vehicle 501 when the electronic device 401 is located in the driver's seat A in the vehicle 501, the vehicle 501 may detect the same first RSSI value "a1" for the electronic device 401 and the other electronic device through the first short-range communication unit 540*a*. However, since the vehicle 501 detects different second RSSI values for the electronic device 401 and the other electronic device through the second short-range communication unit 540*b*, the vehicle 501 detects that the electronic device 401 having the second RSSI value "b2" is located in the driver's seat A in the vehicle 501.

Once the region where the electronic device 401 is located in the vehicle 501 is detected through the at least two short-range communication units 540, the vehicle 501 detects vehicle service information corresponding to at least one of the detected region of the electronic device 401 and the user information received from the electronic device 401. For example, if the detected region of the electronic device 401 is the seat B next to the driver in the vehicle 501, the vehicle 501 detects seat adjustment information as the vehicle service information corresponding to at least one of the detected region (the seat B next to the driver) of the electronic device 401 and the user information received from the electronic device 401. The vehicle 501 automatically adjusts the seat B next to the driver, which corresponds to the region of the electronic device 401, at a previously registered angle.

For example, if the detected region of the electronic device 401 is the right back seat D in the vehicle 501 and the vehicle 501 determines from the user information (e.g., age information) received from the electronic device 401 that the user is younger than a specific age (e.g., a child), then the vehicle 501 detects door lock and window lock information as the vehicle service information corresponding to the region (the right back seat D) of the electronic device 401 and the user information (the user younger than the specific age) received from the electronic device 401. The vehicle 501 controls the right door and the right window of the right back seat D, corresponding to a peripheral region of the electronic device 401, associated with the detected region of the electronic device 401, based on the detected door lock and window lock information, such that the right door and the right window may be automatically locked. In addition, the vehicle 501 may detect vehicle service information (e.g., door lock or window lock) based on the detected region of the electronic device 401 regardless of the user information and may control the door or window corresponding to the region of the electronic device 401 such that the door or window may be locked.

According to various embodiments of the present disclosure, an apparatus for providing a vehicle service includes at least two short-range communication units 540, the memory 530 configured to store at least one vehicle service information corresponding to at least one of a detected region of the electronic device 401 and detected user information of the electronic device 401, and the controller 510 configured to detect at least one of the region of vehicle 501 where the electronic device 401 is located and the user information of the electronic device 401, to detect vehicle service information based on at least one of the detected region of the electronic device 401 and the detected user information of the electronic device 401, and to provide a vehicle service corresponding to the vehicle service information.

According to various embodiments of the present disclosure, the controller 510 is further configured to perform short-range communication between the vehicle 501 and the electronic device 401 located in the vehicle 501 and to detect the region of the vehicle 501 where the electronic device 401 is located by using at least two short-range communication units 540, if the received user information of the electronic device 401 exists among the at least one user information registered in the memory 530.

According to various embodiments of the present disclosure, the controller 510 is further configured to detect vehicle service information corresponding to at least one of the detected region of the electronic device 401 and the detected user information of the electronic device 401 from at least one vehicle service information stored in the memory 530.

According to various embodiments of the present disclosure, the controller 510 is further configured to provide a vehicle service corresponding to the vehicle service information detected from the memory 530 to the detected region of the electronic device 401 or a peripheral region associated with the detected region of the electronic device 401.

According to various embodiments of the present disclosure, the user information of the electronic device 401 comprises at least one of ID information of the electronic device 401, a face image, biometric information, fingerprint information, and unlock information of the electronic device 401.

According to various embodiments of the present disclosure, the vehicle service information comprises at least one of door lock, window lock, seat adjustment, vehicle temperature adjustment, and TV/audio adjustment.

According to various embodiments of the present disclosure, an apparatus for providing a vehicle service includes at least one short-range communication units 430, the memory 440 configured to store at least one vehicle service information corresponding to at least one of a region of the vehicle 501 where the electronic device 401 is located and user information of the electronic device 401, and the processor 410 configured to detect at least one of the region of the vehicle 501 where the electronic device 401 is located and the user information of the electronic device 401, to detect vehicle service information based on at least one of the detected region of the electronic device 401 and the detected user information of the electronic device 401, and to transmit the detected vehicle service information to the vehicle 501.

According to various embodiments of the present disclosure, the processor 410 is further configured to perform short-range communication between the vehicle 501 and the electronic device 401 located in the vehicle 501, to detect the region of the vehicle 501 where the electronic device 401 is located, and to detect the user information of the electronic device 401.

According to various embodiments of the present disclosure, the processor 410 is further configured to detect vehicle service information corresponding to at least one of the detected region of the electronic device 401 and the detected user information of the electronic device 401 from at least one vehicle service information stored in the memory 440.

According to various embodiments of the present disclosure, the user information of the electronic device 401 comprises at least one of ID information of the electronic device, a face image, biometric information, fingerprint information, and unlock information of the electronic device.

According to various embodiments of the present disclosure, the vehicle service information comprises at least one of door lock, window lock, seat adjustment, vehicle temperature adjustment, and TV/audio adjustment.

Figure 5:
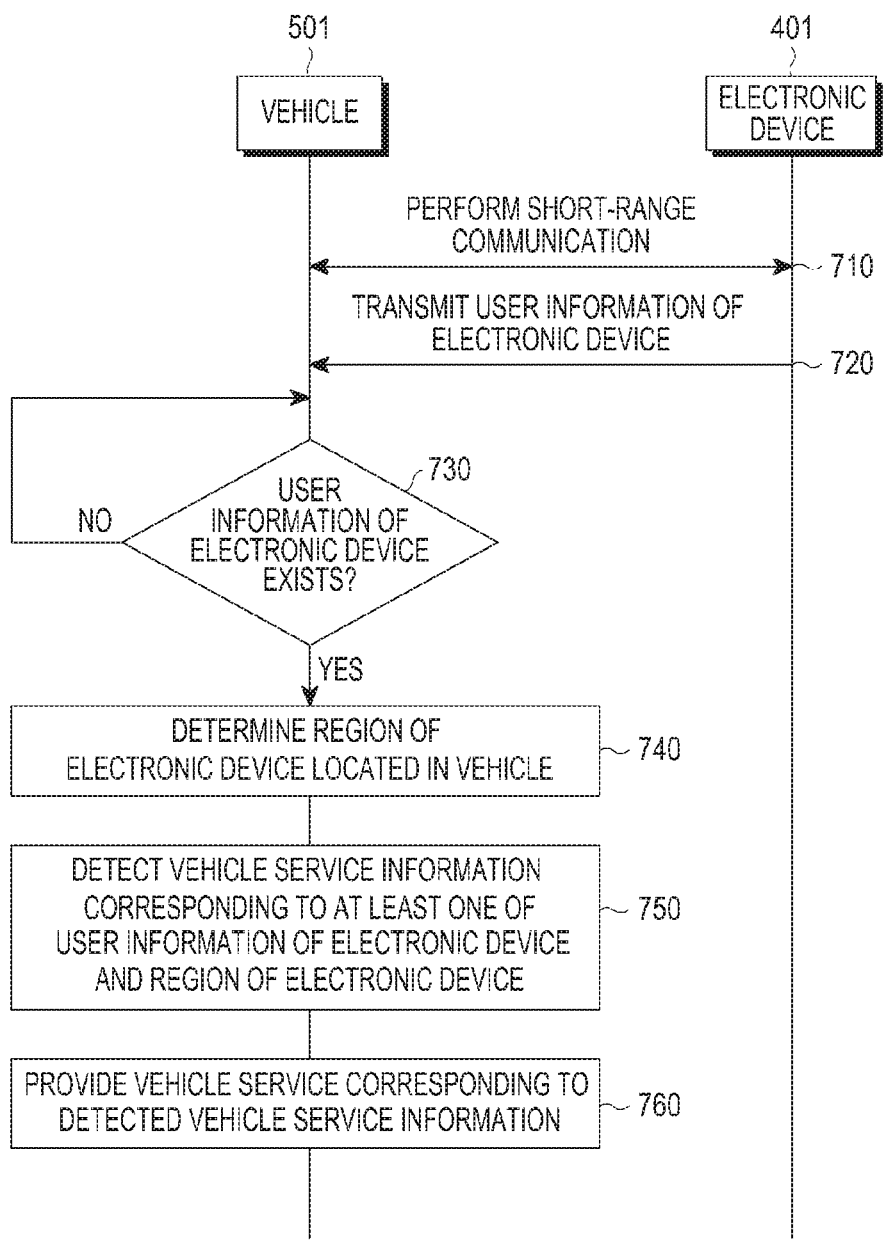
FIG. 5 is a flowchart of a method for providing a vehicle service by a vehicle, according to an embodiment of the present disclosure.

FIG. 5 is a flowchart of a method for providing a vehicle service by a vehicle, according to an embodiment of the present disclosure.

Referring to FIG. 5, in step 710, the at least two short-range communication units 540 of the vehicle 501 and the short-range communication unit 430 the electronic device 401 perform short-range communication with each other. In step 710, the vehicle 501 and the electronic device 401 determine through the short-range communication that the electronic device 401 is located in the vehicle 501.

In step 720, the electronic device 401 transmits user information (e.g., ID information or unlock information of the electronic device 401) of the electronic device 401 detected from the memory 440 or user information (e.g., a face image, biometric information, or fingerprint information) of the electronic device 401 detected through the user information detection unit 420 to the vehicle 501 through the short-range communication.

In step 730, upon receiving the user information of the electronic device 401 from the electronic device 401, the vehicle 501 determines whether the user information of the electronic device 401 received from the electronic device 401 exists among at least one user information of the electronic device 401 stored in the memory 530. If the user information of the electronic device 401 received from the electronic device 401 exists among the at least one user information stored in the memory 530 in step 730, the vehicle 501 determines the region of the vehicle 501 where the electronic device 401 is located by using the at least two short-range communication units 540 in step 740.

In step 750, the vehicle 501 detects vehicle service information corresponding to at least one of the received user information of the electronic device 401 and the detected region of the electronic device 401 from at least one vehicle service information stored in the memory 530.

In step 760, the vehicle 501 provides a vehicle service (e.g., at least one of door lock, window lock, seat adjustment, vehicle temperature adjustment, and TV/audio adjustment) corresponding to the detected vehicle service information to the detected region of the electronic device 401 or to a peripheral region of the vehicle 501 associated with the detected region of the electronic device 401.

Figure 6:
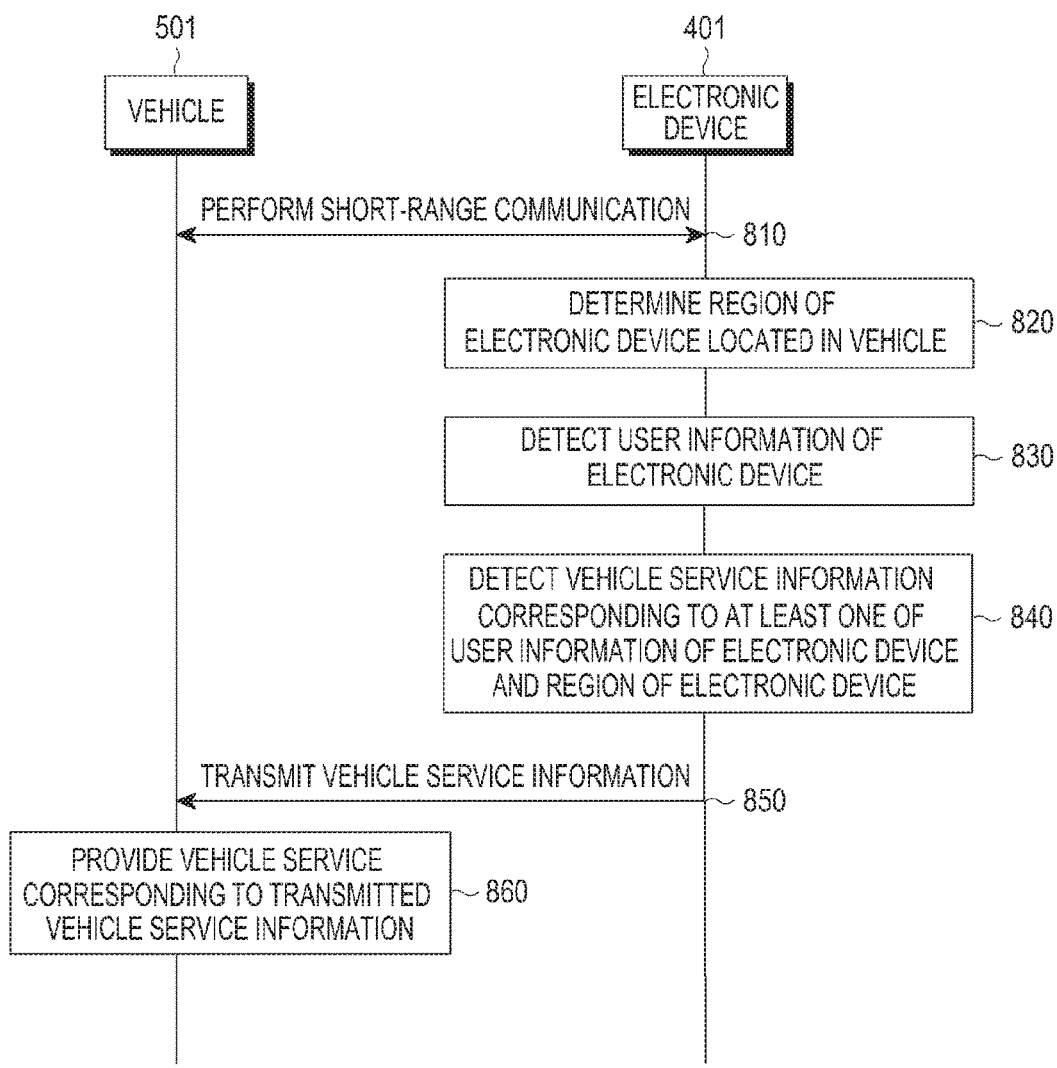
FIG. 6 is a flowchart of a method for providing a vehicle service by an electronic device, according to an embodiment of the present disclosure.

FIG. 6 is a flowchart of a method for providing a vehicle service by an electronic device, according to an embodiment of the present disclosure.

Referring to FIG. 6, in step 810, the at least two short-range communication units 540 of the vehicle 501 and the short range communication unit 430 of the electronic device 401 perform short-range communication with each other. In step 810, the vehicle 501 and the electronic device 401 determine through the short-range communication that the electronic device 401 is located in the vehicle 501.

In step 820, the electronic device 401 detects a region of the vehicle 501 where the electronic device 401 is located using the short-range communication. In step 820, the electronic device 401 receives the detected region of the electronic device 401 from the vehicle 501.

In step 830, the electronic device 401 detects user information (e.g., ID information or unlock information of the electronic device 401) of the electronic device 401 detected from the memory 440 or user information (e.g., a face image, biometric information, or fingerprint information) of the electronic device 401 by using the user information detection unit 420.

In step 840, the electronic device 401 detects vehicle service information corresponding to at least one of the detected user information of the electronic device and the detected region of the electronic device from at least one vehicle service information stored in the memory 440.

In step 850, the electronic device 401 transmits the detected vehicle service information to the vehicle 501 through short-range communication.

In step 860, the vehicle 501 provides a vehicle service (e.g., at least one of door lock, window lock, seat adjustment, vehicle temperature adjustment, and TV/audio adjustment) corresponding to the detected vehicle service information to the detected region of the electronic device 401 or to a peripheral region of the vehicle 501 associated to the detected region of the electronic device 401, based on the region of the electronic device 401 detected using the at least two short-range communication units 540 or based on the detected region information of the electronic device 401 received from the vehicle 501.

According to various embodiments of the present disclosure, a method for providing a vehicle service includes detecting at least one of a region of the vehicle 501 where the electronic device 401 is located and user information of the electronic device 401, detecting vehicle service information based on at least one of the region of the vehicle 501 where the electronic device 401 and the user information of the electronic device 401, and providing a vehicle service corresponding to the vehicle service information.

According to various embodiments of the present disclosure, detecting the at least one of the region and the user information includes performing short-range communication between the vehicle 501 and the electronic device 401 located in the vehicle 501, determining, by the vehicle 501, whether the received user information of the electronic device 401 exists among at least one user information registered in the vehicle 501, upon receiving the user information of the electronic device 401 from the electronic device 401, and detecting, by the vehicle 501, the region of vehicle 501 where the electronic device 401 is located by using at least two short-range communication units 540 included in the vehicle 501, if the received user information of the electronic device 401 exists among the at least one user information registered in the vehicle 501.

According to various embodiments of the present disclosure, detecting the vehicle service information includes detecting, by the vehicle 501, vehicle service information corresponding to at least one of the detected region of the electronic device 401 and the detected user information of the electronic device 401 from at least one vehicle service information stored in the vehicle 501.

According to various embodiments of the present disclosure, providing the vehicle service includes providing, by the vehicle 501, a vehicle service corresponding to the vehicle service information detected by the vehicle 501 to the detected region of the electronic device 401 or to a peripheral region of the vehicle 501 associated with the detected region of the electronic device 401.

According to various embodiments of the present disclosure, detecting at least one of the region and the user information includes performing short-range communication between the vehicle 501 and the electronic device 401 located in the vehicle 501, detecting, by the electronic device 401, the region of vehicle 501 where the electronic device 401 is located, and detecting, by the electronic device 401, the user information of the electronic device 401.

According to various embodiments of the present disclosure, detecting the vehicle service information includes detecting, by the electronic device 401, vehicle service information corresponding to at least one of the detected region of the electronic device 401 and the detected user information of the electronic device from at least one vehicle service information stored in the electronic device 401.

According to various embodiments of the present disclosure, the method further includes transmitting, by the electronic device 401, the detected vehicle service information to the vehicle 501.

According to various embodiments of the present disclosure, the user information of the electronic device 401 includes at least one of identification (ID) information of the electronic device 401, a face image, biometric information, fingerprint information, and unlock information of the electronic device 401.

According to various embodiments of the present disclosure, the vehicle service information includes at least one of door lock, window lock, seat adjustment, vehicle temperature adjustment, and television (TV)/audio adjustment.

As is apparent from the foregoing description, the method and apparatus for providing a vehicle service according to various embodiments of the present disclosure may conveniently provide the vehicle service based on a position of a user in a vehicle.

Various changes in form or detail may be made to the present disclosure by one of ordinary skill in the art without departing from the scope of the present disclosure, and the present disclosure is not limited to the above-described embodiments and the accompanying drawings. Therefore, the scope of the present disclosure is defined, not by detailed description and embodiments, but by the following claims and their equivalents.

What is claimed is:

1. A method for providing a vehicle service, the method comprising:
   detecting, by a vehicle, a region of the vehicle where an electronic device is located and user information of the electronic device;
   detecting vehicle service information based on the detected region and the detected user information of the electronic device; and
   providing the vehicle service corresponding to the detected vehicle service information,
   wherein the user information of the electronic device comprises information indicating that the user is a child, and
   wherein the detected vehicle service information comprises a safety service for the child including door lock and window lock for a door and a window corresponding to the detected region.

2. The method of claim 1, wherein detecting the region and the user information comprises:
   performing short-range communication between the vehicle and the electronic device located in the vehicle;
   determining, by the vehicle, whether the detected user information of the electronic device exists among at least one user information registered in the vehicle; and
   detecting, by the vehicle, the region of the vehicle where the electronic device is located, when the detected user information of the electronic device exists among the at least one user information registered in the vehicle.

3. The method of claim 1, wherein detecting the vehicle service information comprises:
   detecting, by the vehicle, vehicle service information corresponding to the detected region and the detected user information of the electronic device from at least one vehicle service information stored in the vehicle.

4. The method of claim 1, wherein providing the vehicle service comprises:
   providing, by the vehicle, a vehicle service corresponding to the detected vehicle service information to the detected region or a peripheral region associated with the detected region.

5. The method of claim 1, wherein detecting the region and the user information comprises:
   performing short-range communication between the vehicle and the electronic device located in the vehicle;
   detecting, by the electronic device, the region of the vehicle where the electronic device is located; and
   detecting, by the electronic device, the user information of the electronic device.

6. The method of claim 1, wherein detecting the vehicle service information comprises:
   detecting, by the electronic device, vehicle service information corresponding to the detected region and the detected user information of the electronic device from at least one vehicle service information registered in the electronic device.

7. The method of claim 6, further comprising:
   transmitting, by the electronic device, the detected vehicle service information to the vehicle.

8. The method of claim 1, wherein the user information of the electronic device further comprises biometric information.

9. The method of claim 1, wherein the vehicle service information further comprises at least one of seat adjustment, vehicle temperature adjustment, and television (TV)/audio adjustment.

10. An apparatus for providing a vehicle service, the apparatus comprising:
    at least two short-range communication units;
    a memory configured to store at least one vehicle service information corresponding to a region of a vehicle where an electronic device is located and user information of the electronic device; and
    a controller of the vehicle configured to:
      detect the region of the vehicle where the electronic device is located and the user information of the electronic device,
      detect vehicle service information based on the detected region and the detected user information of the electronic device, and
      provide a vehicle service corresponding to the detected vehicle service information,
    wherein the user information of the electronic device comprises information indicating that the user is a child, and wherein the detected vehicle service information comprises a safety service for the child including door lock and window lock for a door and a window corresponding to the detected region.

11. The apparatus of claim 10, wherein the controller is further configured to:
perform short-range communication between the vehicle and the electronic device located in the vehicle, and
detect the region of the vehicle where the electronic device is located by using the at least two short-range communication units, when the detected user information of the electronic device exists among the user information stored in the memory.

12. The apparatus of claim 10, wherein the controller is further configured to detect the vehicle service information corresponding to the detected region and the detected user information of the electronic device, from the at least one vehicle service information stored in the memory.

13. The apparatus of claim 10, wherein the controller is further configured to provide the vehicle service corresponding to the vehicle service information to the detected region or a peripheral region associated with the detected region.

14. The apparatus of claim 10, wherein the user information of the electronic device further comprises biometric information.

15. The apparatus of claim 10, wherein the vehicle service information further comprises at least one of seat adjustment, vehicle temperature adjustment, and television (TV)/audio adjustment.

16. An apparatus for providing a vehicle service, the apparatus comprising:
at least one short-range communication unit;
a memory configured to store at least one vehicle service information corresponding to a region of a vehicle where an electronic device is located and user information of the electronic device;
a processor configured to:
detect the region of the vehicle where the electronic device is located and the user information of the electronic device,
detect vehicle service information based on the detected region and the detected user information of the electronic device, and
transmit the detected vehicle service information to the vehicle; and
a display configured to display the detected vehicle service information,
wherein the user information of the electronic device comprises information indicating that the user is a child, and
wherein the detected vehicle service information comprises a safety service for the child including door lock and window lock for a door and a window corresponding to the detected region.

17. The apparatus of claim 16, wherein the processor is further configured to perform short-range communication between the vehicle and the electronic device located in the vehicle to detect the region of the vehicle where the electronic device is located.

18. The apparatus of claim 16, wherein the processor is further configured to detect the vehicle service information corresponding to the detected region and the detected user information of the electronic device, from the at least one vehicle service information stored in the memory.

19. The apparatus of claim 16, wherein the user information of the electronic device further comprises biometric information.

20. The apparatus of claim 16, wherein the vehicle service information further comprises at least one of seat adjustment, vehicle temperature adjustment, and television (TV)/audio adjustment.

* * * * *